United States Patent [19]
Pouillange

[11] Patent Number: 4,758,756
[45] Date of Patent: Jul. 19, 1988

[54] VERNIER-TYPE ELECTRODYNAMIC MACHINE
[75] Inventor: Jean P. Pouillange, Gressy, France
[73] Assignee: Alsthom-Atlantique, Paris, France
[21] Appl. No.: 892,456
[22] Filed: Aug. 4, 1986

Related U.S. Application Data
[63] Continuation of Ser. No. 721,739, Apr. 10, 1985, abandoned.

[30] Foreign Application Priority Data
Apr. 13, 1984 [FR] France ................................ 84 05888

[51] Int. Cl.$^4$ ........................................... H02K 21/00
[52] U.S. Cl. ...................................... 310/152; 310/12; 310/49 R; 310/266; 310/156
[58] Field of Search .................... 310/12-14, 310/49, 181, 156, 154, 152

[56] References Cited
U.S. PATENT DOCUMENTS

| | | | |
|---|---|---|---|
| 1,894,979 | 1/1933 | Chubb | 310/103 X |
| 3,025,420 | 3/1962 | McCourt | 310/103 |
| 3,268,747 | 8/1966 | Snowdon | 310/13 |
| 3,984,711 | 10/1976 | Kordik | 310/181 X |
| 4,190,779 | 2/1980 | Schaeffer | 310/12 |
| 4,246,504 | 1/1981 | Clifford et al. | 310/181 |
| 4,315,171 | 2/1982 | Schaeffer | 310/12 X |
| 4,501,980 | 2/1985 | Welburn | 310/12 |
| 4,663,551 | 5/1987 | Weh et al. | 310/12 X |
| 4,675,582 | 6/1987 | Hommes | 310/12 X |
| 4,695,777 | 9/1987 | Asano | 310/12 X |
| 4,712,028 | 12/1987 | Horber | 310/12 X |

OTHER PUBLICATIONS
IBM Tech. Disclosure Bulletin, "Linear Incremental Motor, Thompson, Vol. 6, No. 9, Feb./1964.

Primary Examiner—Mark O. Budd
Attorney, Agent, or Firm—Sughrue, Mion, Zinn, Macpeak & Seas

[57] ABSTRACT

The invention provides a machine based on a known type of vernier electrodynamic machine comprising two parts separated from one another by an air gap arranged along a surface, said parts being movable relative to one another in one direction of said surface such that the width of said air gap (180) is kept constant, the first of said parts (161) consisting of a magnetic armature with N teeth forming N slots opening onto said air gap and being evenly spaced along said direction, the second part (171) comprising either M teeth forming M slots having a different pitch from that of the teeth of said first part arranged along said direction, or P groups of Q teeth with the same pitch as the teeth of the first part, said groups of teeth being staggered to yield said vernier effect, and means for creating in said air gap a magnetic field sliding along said direction relative to said first part, wherein each of said teeth (165, 175) of said first (161) and second (171) parts is provided with magnetic induction generators (166, 176) creating magnetic fluxes normal to said gap and oriented in the same direction. Applications to a motor, a generator and a speed reducer are described.

5 Claims, 8 Drawing Sheets

VERNIER-TYPE ELECTRODYNAMIC MACHINE

This is a continuation of application Ser. No. 721,739, filed Apr. 10, 1985, now abandoned.

BACKGROUND OF THE INVENTION

This invention concerns a vernier-type electrodynamic machine.

A machine of this type is known, comprising two parts separated from one another by an air gap arranged along a surface, said parts being operable to move relative to one another in one direction of said surface such that the width of the air gap is kept constant, the first of said parts consisting of a magnetic armature with N teeth forming N slots opening onto the air gap and being evenly distributed along said direction, the second part comprising M elements arranged along said direction, M being a whole number different from N, said elements being operable, due to the difference between M and N, to create shifts within the air gap relative to the armature teeth, said successive shifts varying along said direction according to a linear mean law, and means for creating in said gap a multipolar magnetic field, and means cooperating magnetically with the armature to create within said gap a magnetic field of the same polarity as the previous filed, said second field sliding along said direction in relation to the armature, said shifts bringing about a difference between the sliding speed of the sliding field and the speed of one part relative to the other when said two previously mentioned fields move synchronously.

Several specific forms of vernier-type electrodynamic machines known in the prior art are described below by way of example, with reference to the first half of the appended drawings in which.

Figure 1:
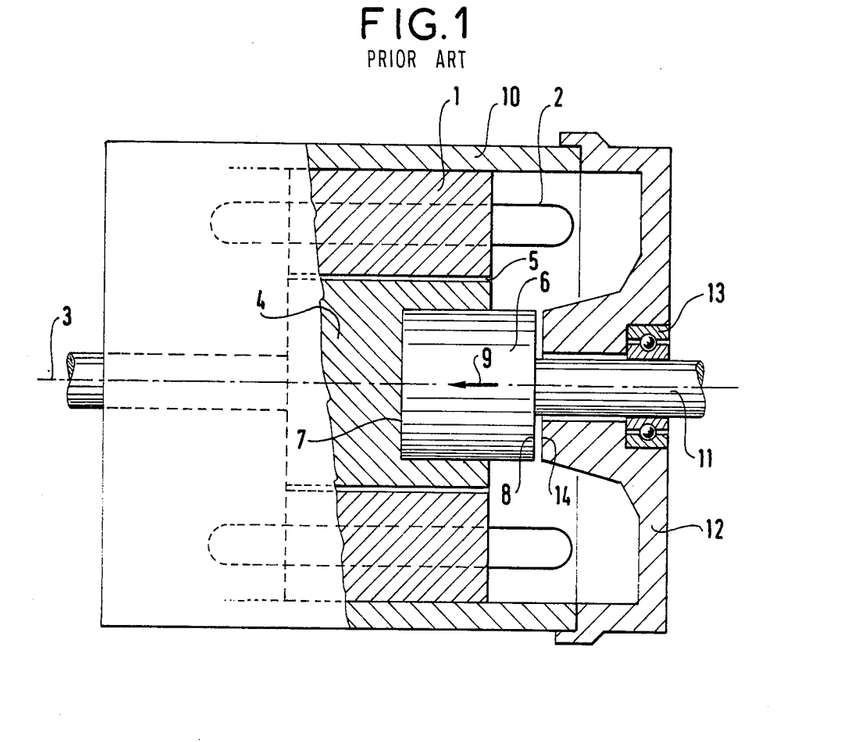
FIG. 1 is a partial longitudinal cross section of a known vernier-type motor.

The vernier-type motor illustrated in FIG. 1 comprises a stator 1 with a winding 2. The stator 1 is made from an assembly of tooth-edged magnetic plates and the winding 2, a 2 p pole polyphase design, is wound in the slots between the stator teeth. The stator 1 is an annular, cylindrical body of revolution about an axis 3. A toothed rotor 4, also made from magnetic plates, is mounted rotatably about axis 3, is positioned within the internal cylindrical volume of stator 1 and is separated from the latter by a cylindrical air gap 5. A cylindrical magnet 6 is coaxially fitted in rotor 4. It is fastened therein so that one flat end 7 of the magnet is within the volume of the rotor 4 and the other flat end 8 is located outside said volume. Magnet 6 is magnetized in direction 9, going from end 8 to end 7, such as to set up in rotor 4 a magnetic flux crossing air gap 5 and penetrating into the stator 1. Said stator is attached to the inside of a cylindrical magnetic shell 10. Rotor 4 and magnet 6 are attached to a shaft 11 rotatable about axis 3 in two bearings supported by the shell 10. The end bell 12 shown in cross section in FIG. 1 comprises a ball bearing 13 for shaft 11. This end bell 12 is made of magnet steel and comprises a surface 14 disposed near and facing end surface 8 of magnet 6 such as to close the magnetic circuit created by magnet 6.

Figure 2:
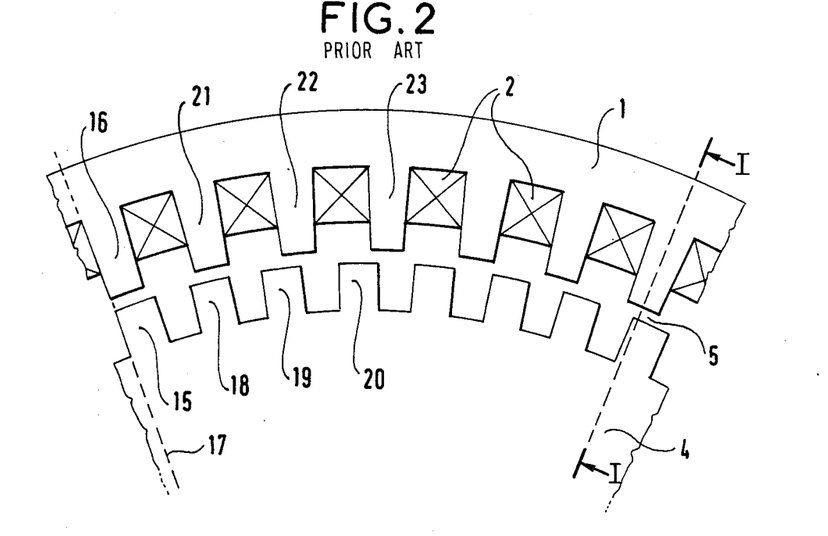
FIG. 2 is a partial cross sectional view showing the stator and rotor tooth outline of the motor illustrated in FIG. 1.

As shown in FIG. 2, the stator 1 teeth are evenly spaced around the axis of the machine. Said stator has n equal slot pitches per pair of poles as defined by the winding 2. The rotor 4 teeth are also evenly spaced around the axis of the machine, but the rotor has more teeth than the stator; rotor 4 for example may have n+1 teeth per pole pair. The rotor's position relative to the stator in FIG. 2 is such that one side of a tooth 15 on the rotor is aligned with one side of a tooth 16 on the stator according to a radial direction 17. As is apparent, the following teeth 18, 19, 20 of the rotor are offset in relation to their matching teeth 21, 22, 23 on the stator. These staggerings have a magnetic effect in the gap 5 traversed by the magnetic flux from magnet 6.

When the winding 2 is supplied with polyphase current, it sets up a revolving field about axis 3. The motor depicted in FIGS. 1 and 2 is a homopolar sychronous design. The magnetic flux created by magnet 6 must revolve at the same speed as the revolving field. Due to the staggering mentioned above, the rotor rotates at a slower speed equal to the quotient of the speed of the revolving field and a coefficent K.

In the case where the stator has n teeth per pair of poles and the rotor n+1 teeth per stator pole pair, said coefficient K equals n+1. This speed reduction is accompanied, unlike in a common synchronous machine with the same continuous field flowing through its armature, by an increase in torque, said torque being multiplied by said K factor.

It is possible however to make vernier-type machines according to the prior art in which the successive staggering steps each correspond to several slot pitches. For example, in the motor represented in FIG. 3, the rotor 24 has evenly spaced slots, while the stator 25 has groups of slots, each of which groups is separated from the next by an interval. Each group comprises several slots spaced equally both with respect to each other and with respect to the rotor slot pitch. The figure shows a first group of stator slot pitches comprising teeth 26, 27 and 28 and a second stator group comprising teeth 29, 30 and 31. These two groups are separated from one another by an interval 32 able to accommodate a stator coil bundle 33.

Figure 3:
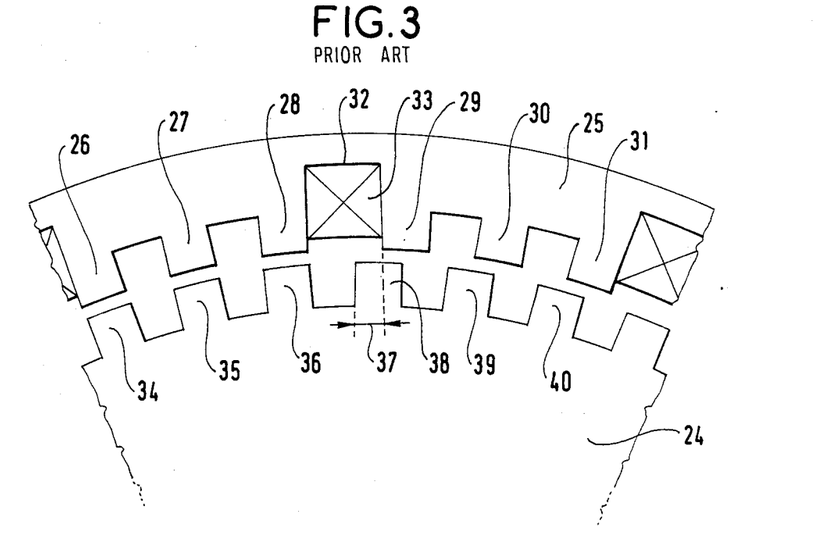
FIG. 3 is a partial cross sectional diagram of another known type of vernier motor.

In the position represented in FIG. 3, teeth 26, 27 and 28 are exactly aligned with rotor teeth 34, 35 and 36. Interval 32 is determined to provide a staggering such as 37 between stator teeth 29, 30 and 31 and rotor teeth 38, 39 and 40.

Figure 4:
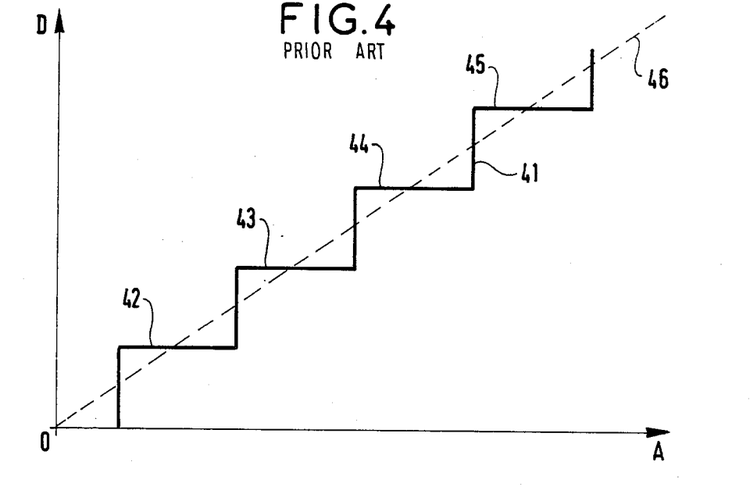
FIG. 4 is a graphic representation of the operation of the motor partly outlined in FIG. 3.

FIG. 4 graphs the law of variation 41 of the offsets along the air gap in the type of machine illustrated in FIG. 3. The position along the gap is plotted on the X-axis in terms of an angle A in relation to a reference axial plane and the offsets D are plotted on the Y-axis. It can be seen that curve 41 includes successive plateaus 42, 43, 44 and 45. Based on this law of step changes, it is possible to define a linear mean law 46.

In practice the two constructional types of vernier motors represented in FIGS. 2 and 3 operate the same way.

The operating principle for vernier-type electrodynamic machines also applies to vernier-type generators, in which case the rotor of the machines represented in FIGS. 2 and 3 is made to rotate, for example, and the electric current generated in the stator coils of these machines is collected.

The same principle also applies to linear vernier-type machines in which the air gap is not arranged along a cylindrical surface but along a plane surface separating the two relatively moving parts; the moving part then moves relative to the stationary part along a straight path parallel to the air gap surface.

It is further possible to make vernier-type electrodynamic machines which operate as rotary reducers.

Figure 5:
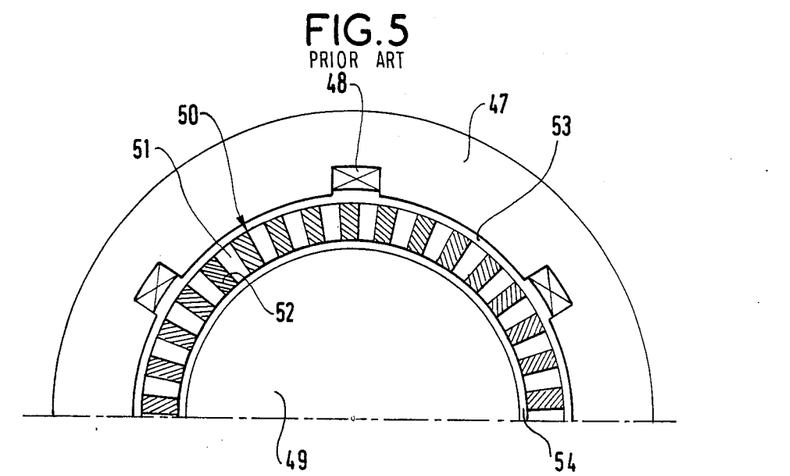
FIG. 5 is a partial cross sectional diagram of a known vernier-type speed reducer.

The prior art reducer represented in FIG. 5 comprises a first, annular shaped rotor 47. This rotor has no teeth but carries a continuous winding 48 with 2 p poles. Said reducer further comprises a second, cylindrical and coaxial rotor 49. The latter rotor has teeth, not shown in the drawing, which are identical to those of the motor rotor of FIG. 2. Between said rotors 47 and 49 an annular shaped stator 50 is provided and coaxially mounted, having n radial teeth 51 per pole pair, said teeth being separted from one another by spacers 52 made from an amagentic material. Cylindrical air gaps 53 and 54 separate rotors 47 and 49.

When the rotor 47 is rotatively driven at a speed v and the winding 48 is supplied with direct current, this sets up a revolving field which radially crosses the stator 50 and penetrates the second rotor 49. It is thus apparent that the assembly 47-53-50 is the equivalent of the stator in the motors of FIGS. 2 and 3. Under these conditions, if rotor 49 has n+1 teeth per pole pair of winding 48, then rotor 49 rotates at a speed of v/n+1.

Figure 6:
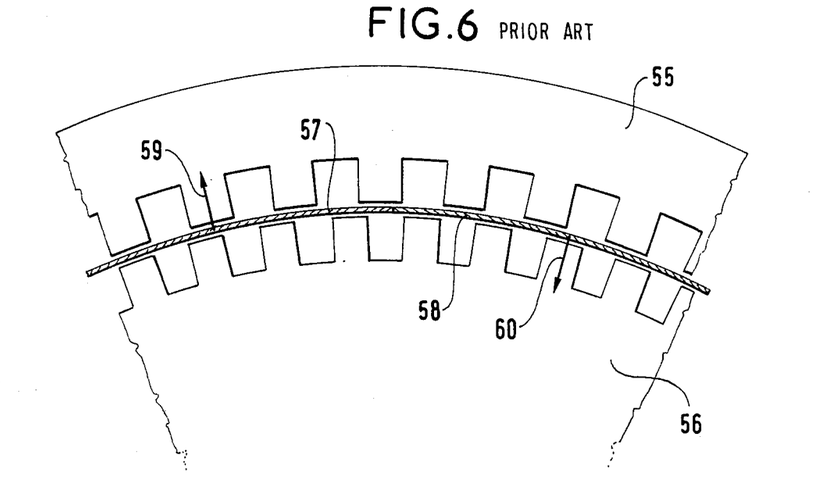
FIG. 6 is a partial cross sectional diagram of another known vernier-type speed reducer.

Still another prior art vernier-type reducer is illustrated in FIG. 6, comprising a stator 55 and a rotor 56, arranged coaxially and both having teeth. The revolving field is produced in this case by another coaxial rotor 57 located in the air gap between stator 55 and rotor 56. Rotor 57 comprises 2 p magnets such as 58, which are juxtaposed along the air gap and whose radial directions of magnetization 59 and 60 alternate to create a revolving field with 2 p poles. If the stator 55 has n slots per pole pair and the rotor 56 has n+1 slots per pole pair, driving rotor 57 at a speed v causes rotor 56 to rotate at a speed v/n+1.

Consequently, as a rule, the vernier-type electrodynamic machines of the known art are homopolar, synchronous types of machine whose two relatively moving parts each comprise a set of teeth, said sets of teeth facing one another and the number of teeth in one set being different from the number of teeth in the facing set.

There are disadvantages with these machines. In particular, they must be provided with a narrow air gap in order to enhance the vernier effect provided by the staggering of the teeth. This cutting back on the air gap entails, due to the saturation of the magnetic circuit, a decrease of the number of ampere turns and consequently of the machine's torque. Moreover, the mgnetic flux of these machines includes a homopolar component which contributes to saturating the magnetic circuit, without producing any torque. This results in undue bulkiness which may preclude the use of these machines for some applications.

The present invention is directed to obviating these drawbacks.

The invention provides a vernier-type electrodynamic machine of the kind comprising two parts separated from one another by an air gap arranged along a surface, said parts being operable to move relative to one another in one direction of said surface such that the width of the air gap is kept constant, the first of said parts consisting of a magnetic armature with N teeth forming N slots opening onto the air gap and evenly spaced along said direction, the second part comprising either M teeth arranged along said direction and forming M slots with a different pitch form that of the teeth of said first part, or P groups of Q teeth arranged along same said direction and having the same pitch as that of the teeth of said first part, said groups being staggered to yield a vernier effect, and means for establishing in said air gap a magnetic field sliding relative to said first part along said direction, wherein each of the teeth of the first and second parts comprises magnetic induction generators creating induction fluxes normal to the air gap and oriented in the same direction.

Various embodiments of the invention will now be described with reference to the remaining figures, wherein.

Although the examples given concern rotating machines, it should be obvious to those skilled in the art that the invention also applies to linear machines, providing suitable modifications are made.

Figure 7:
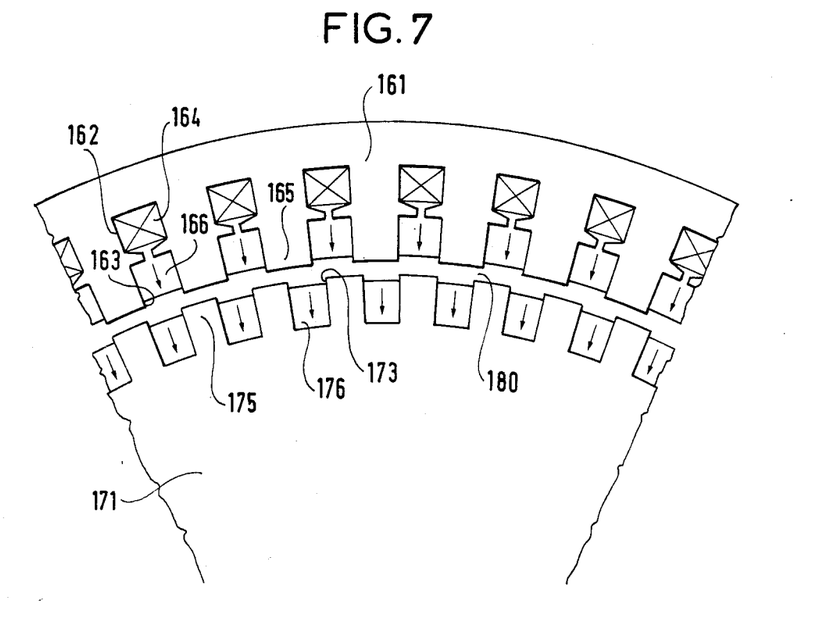
FIG. 7 is a partial cross sectional diagram of a machine according to a first embodiment of the invention.

The vernier-type electric machine illustrated in FIG. 7 comprises a stator 161 made from an assembly of magnetic plates cut out to form slots such as slots 162 and 163. Slots 162, of which there are N=np, are provided with a polyphase winding 164 to create an alterntating field with 2 p poles.

Slots 163, which define teeth 165, are provided with permanent magnets such as magnet 166, arranged to set up a radial induction field in any desired direction and specifically in this case, oriented toward the center of the motor (arrow).

The machine further comprises a rotor 171, also made from magnetic plates cut out to form slots 173 and teeth 175, each of these being M=mp in number, where m is not equal to n, m being for example equal to n+1.

Said slots 173 are filled by permanent magnets 176 arranged to provide a radial induction directed the same way as the inductions provided by the stator magnets. Said stator and rotor are separated by an air gap 180.

The permanent magnets are designed to create radial excitation fluxes.

Figure 8:
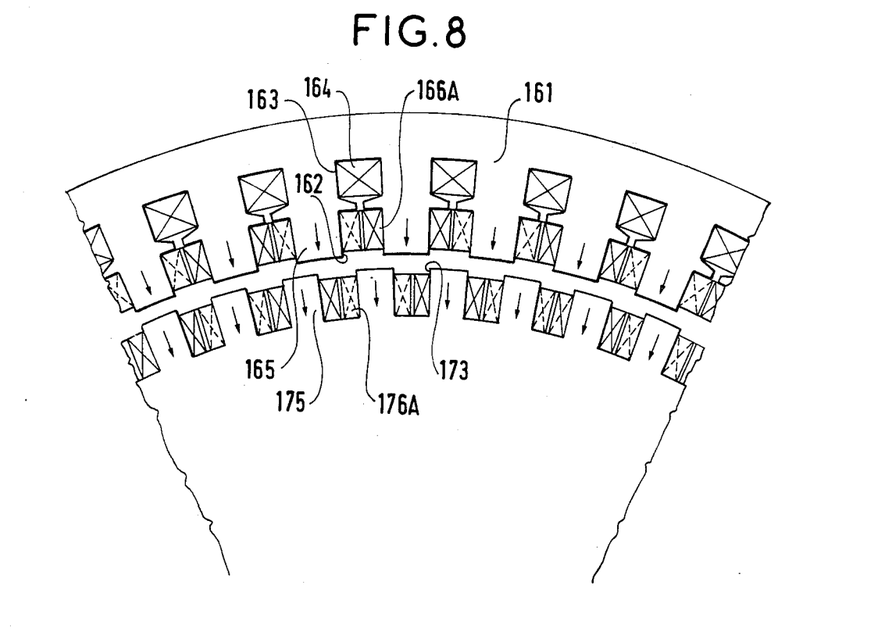
FIG. 8 is a partial cross sectional diagram of a machine according to a second embodiment of the invention.
Figure 9:
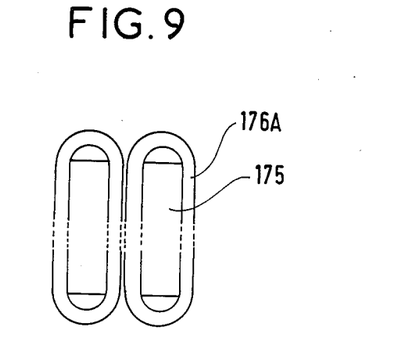
FIG. 9 is a detail fo FIG. 8.

In the embodiment depicted in FIGS. 8 and 9, these fluxes are created by windings 166A (stator) and 176A (rotor) which are wound around the teeth and carry DC currents.

Figures 10, 11:
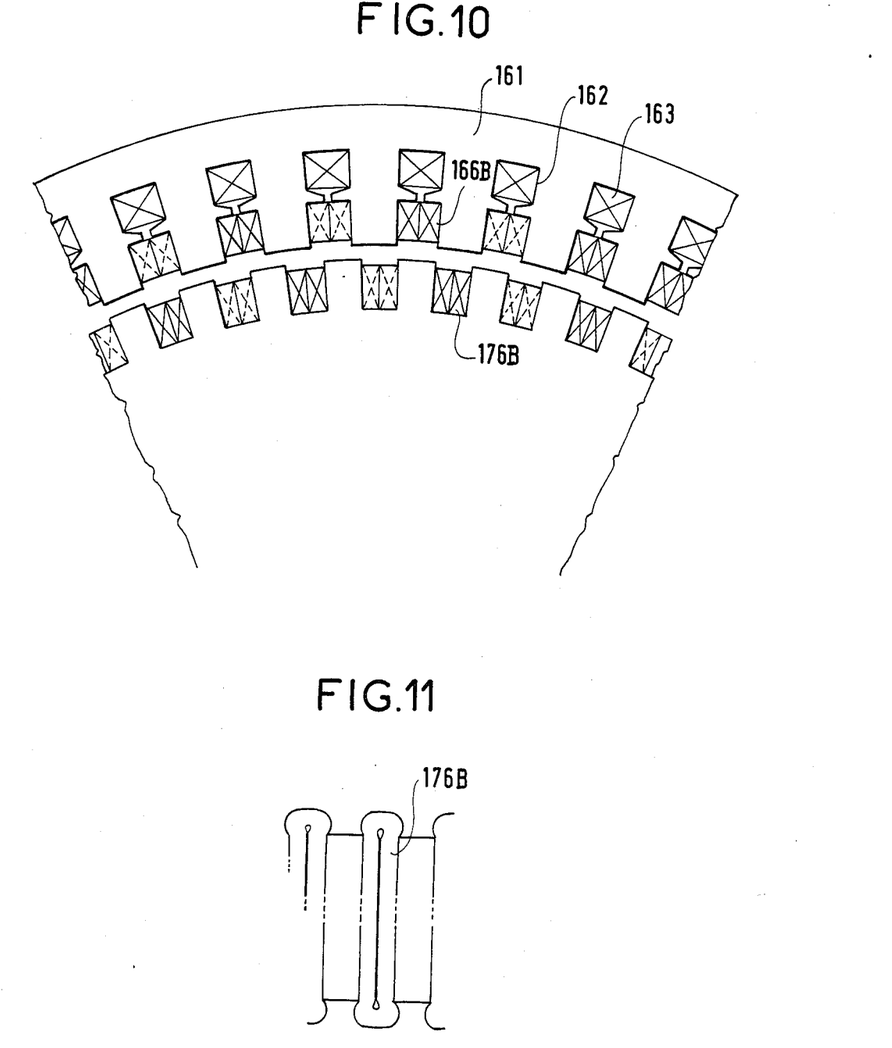
FIG. 10 is a partial cross sectional diagram of a machine according to a third embodiment of the invention.
FIG. 11 is a detail of FIG. 10.

In the embodiment of FIGS. 10 and 11, said fluxes are created by windings such as 166B (stator) and 176B (rotor) placed within each of the teeth.

It should be noted that, in the three alternative embodiments depicted by FIGS. 7 through 11, the slots 162 and the windings 164 intended to produce the revolving field can be eliminated and said field generated by windings placed in a certain number of slots 163 instead of the corresponding magnets.

The machines of FIGS. 7 through 11 can operate either as motors or as generators, as required.

For motor working, polyphase current is fed to the windings 164 and mechanical torque is taken from the rotor.

For generator working, the rotor is driven and polyphased current is collected from the stator.

Figure 12:
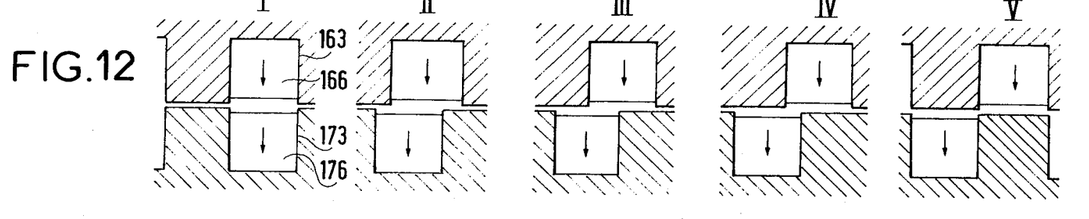
FIGS. 12, 13 and 14 diagram the operation of the machine.
Figures 13, 14:
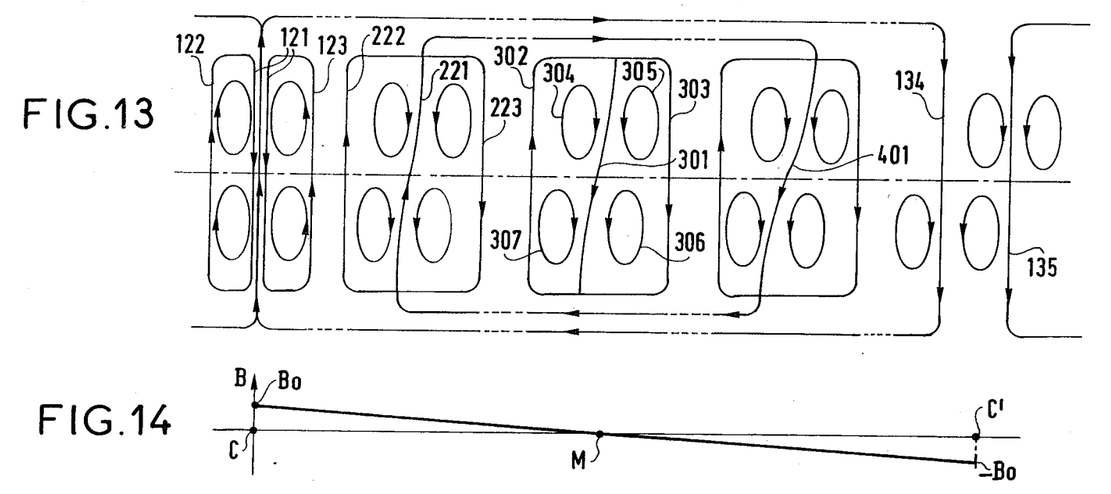

The operation of the machine is illustrated by FIGS. 12 to 14.

FIG. 12 shows the slots 163 and 173 of the stator and rotor respectively in various alignments occurring at any given time at various points along the rotor and the stator.

In the left part of the figure, the stator and rotor slots are exactly aligned (position I).

At the far right (position V), said slots are staggered a full tooth width apart.

In the center (position III), said slots are staggered by a half-tooth.

Two further, intermediate positions (II and IV) are shown between the extreme and center positions.

FIG. 13 diagrams the paths follwed by the lines of force produced by the magnets.

In position III the magnet fluxes practically close back on the spot. The main flux 301 loops back through loops 302, 303, which never move more than a half-tooth away. Reference numbers 304 through 307 designate the small field loops associated with the air gap.

In position I, the flux 121 loops back on the spot through 122 and 123. In position V, flux 134 loops to position I and flux 135 loops symmetrically where it finds the least reluctance.

In position II, flux 221 loops back on the spot through 222 and 223 and in position IV, part of flux 401 loops to position II.

Basically, the magnetic loading varies as a function of the space between two tooth alignment configures, ie. between facing and full-tooth offset configurations, between two values Bo and +Bo, as illustrated in FIG. 14.

There is indeed a true vernier effect. If the stator has np teeth and the rotor (n+1)p teeth, and if the stator field rotates at a speed V, the rotor rotates at a speed of V/n+1.

Compared with the prior art machines described in the first part hereinbefore, the machines according to the invention meet the aforestated specification for a better torque-to-weigth ratio.

Moreover, holding all other factors constant, they provide a better power factor (cos $\theta$).

The machines according to the invention just described exhibit evenly spaced teeth on both their stators and rotors, with two different pitches for the stator and the rotor.

Alternatively, the machine according to the invention can also be made with regularly spaced teeth on one moving part and discontinuously spaced teeth on the other moving part, consisting of P gorups of Q teeth with the same pitch as said regularly spaced teeth; said groups being suitably staggered as in the prior art and FIG. 3 to provide a vernier effect.

Figure 15:
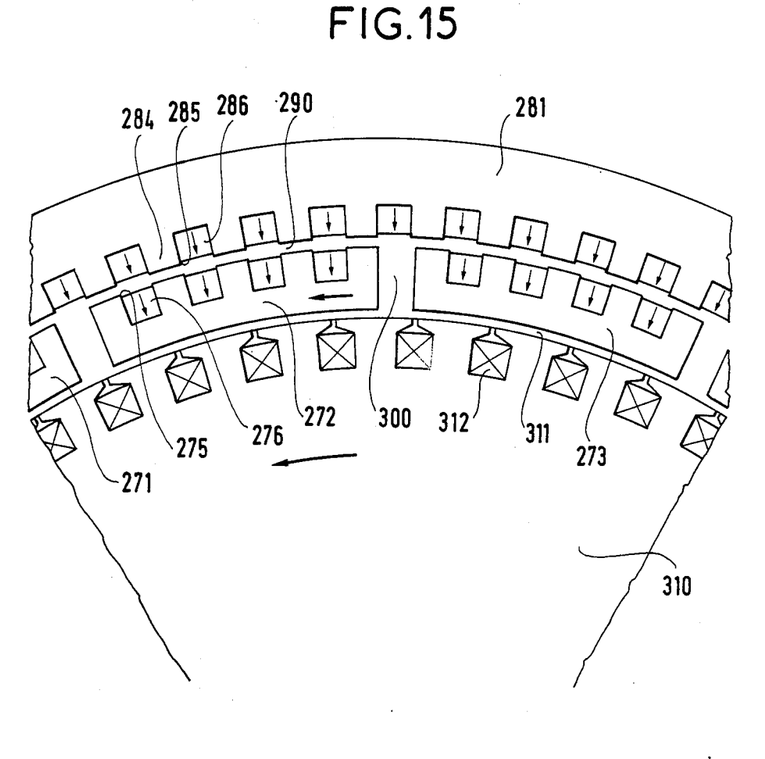
FIG. 15 is a partial cross sectional diagram of a reducer according to a preferred embodiment of the invention.

The previously described machine can easily be modified to operate as torque reducer, an example of which is given in FIG. 15.

The rotor 271 for such a reducer comprise a plurality of groups of teeth (two groups 272 and 273 of five teeth 274 and four slots 275 each are shown in FIG. 15) separated by air gaps such as 300 which are much wider than the others to be described hereinafter. The mechanical connections between the several groups, consisting of amagnetic parts. Gap 300 is slightly greater than a multiple of one pitch so as to establish the vernier effect.

The stator 281 comprises teeth 284 and slots 285 with the same pitch as the teeth of the rotor tooth groups. The stator and the rotor are separated by a very narrow air gap 290.

The rotor slots 275 and stator slots 285 are provided with flux generators oriented in the same radial direction, as indicated by the arrows. Said rotor and stator slots are shown here to carry magnets 276 and 286 respectively.

A second rotor 310, separated from rotor 271 by a very narrow air gap 311, carries windings 312 to generate a multipolar field.

The number and disposition of the windings are selected so that said multipolar field has the same number of poles as that created by the stator magnets.

This reducer's operation is analogous to that of the prior art reducers, but it affords all the advantges of the invention that were mentioned in discussing motors and generators.

What is claimed is:

1. A vernier-type electrodynamic machine of the kind comprising two parts separated from one another by an air gap arranged along a surface, said parts being operable to move relative to one another in one direction of said surface such that the width of the air gap is kept constant,
   the first of said parts consisting of a magnetic armature with N teeth forming N slots opening onto the air gap and evenly spaced along said direction,
   the second part comprising M teeth arranged along said direction, forming M slots, M being different from N, and yielding a vernier effect,
   and means for establishing in said air gap a rotating magnetic field relative to said first part along said direction,
   the improvement comprising permanent magnets within the slots between the teeth of both said first and second parts to create induction fluxes normal to the air gap and oriented in the same direction.

2. Vernier-type electrodynamic machine according to claim 1, wherein the means for creating a rotating field include a polyphase winding secured to the armature.

3. Vernier-type machine according to claim 1, wherein said means for creating a rotating field comprise windings supplied with DC current, said windings being located on a third moving part separated from said first part by a second air gap.

4. Vernier-type mahine according to claim 1, being specifically of the rotating type.

5. A vernier-type electrodynamic machine of the kind comprising two parts separated from one another by an air gap arranged along a surface, said parts being operable to move relative to one another in one direction of said surface such that the width of the air gap is kept constant, the first of said parts consisting of a magnetic armature with N teeth forming N slots opening onto the air gap and evenly spaced along said direction, the second part comprising P groups of Q teeth forming Q slots arranged along said same direction and having the same pitch as that of the teeth of said first part, said groups being staggered to yield a vernier effect, and means for establishing in said air gap a rotating magnetic field relative to said first part along said direction, the improvement comprising permanent magnets within the slots between the teeth of both said first and second parts to create induction fluxes normal to the air gap and oriented in the same direction.

* * * * *